June 4, 1968  H. L. FARMER ET AL  3,386,371
BANDING MACHINE

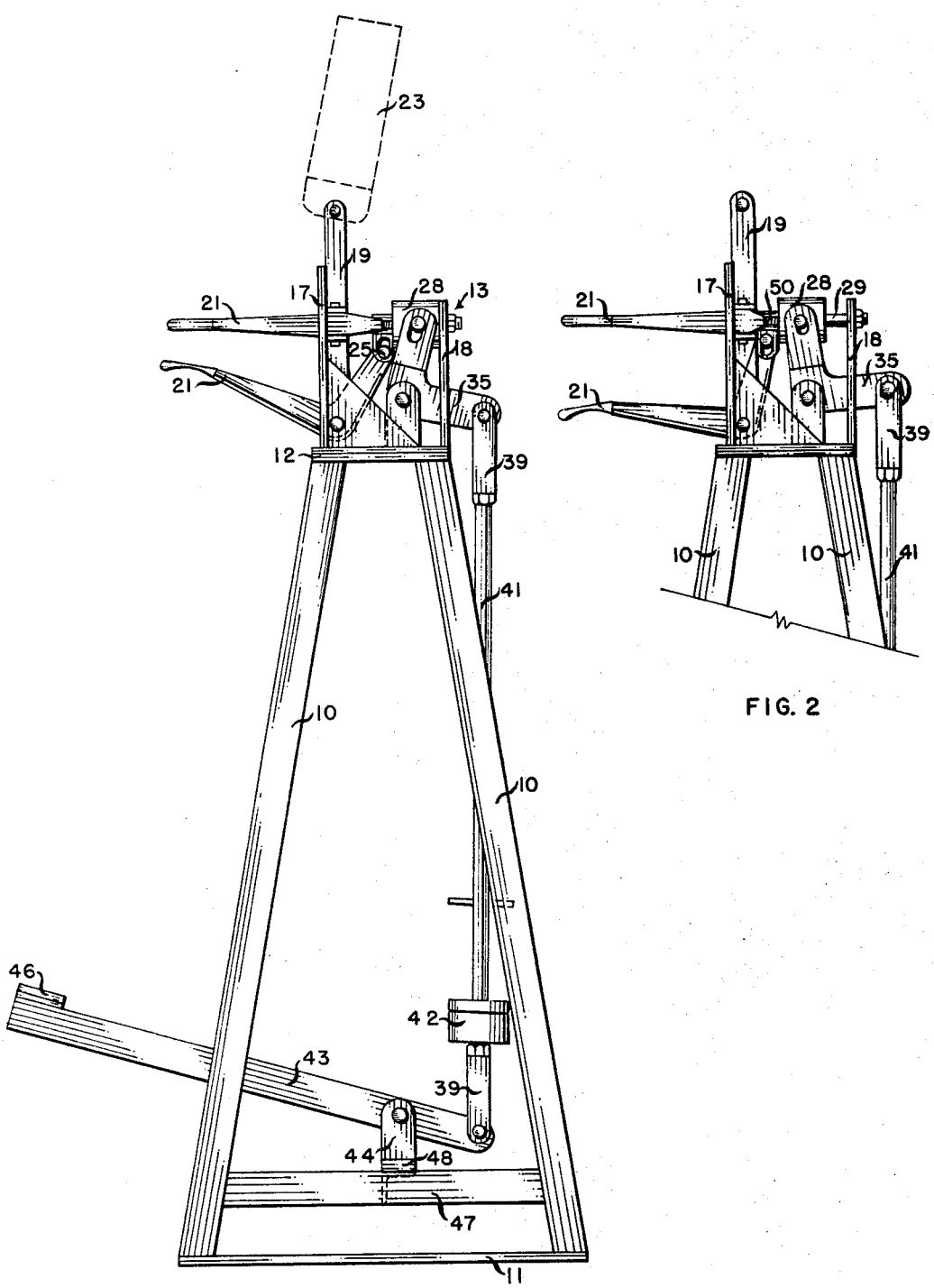

Filed Aug. 5, 1965  4 Sheets-Sheet 3

June 4, 1968 H. L. FARMER ETAL 3,386,371
BANDING MACHINE

Filed Aug. 5, 1965 4 Sheets-Sheet 4

United States Patent Office 3,386,371
Patented June 4, 1968

3,386,371
BANDING MACHINE
Harold L. Farmer and Robert Waltman, Baton Rouge, La., assignors to Ethyl Corporation, New York, N. Y., a corporation of Virginia
Filed Aug. 5, 1965, Ser. No. 477,411
3 Claims. (Cl. 100—9)

ABSTRACT OF THE DISCLOSURE

An apparatus for applying plastic bands to a plurality of elongated objects. Apparatus includes a support frame having a plurality of fingers pivotally mounted thereon intermediate their ends. A reciprocating body is provided which engages the rearward end of the pivotally mounted fingers to open and close the fingers. Coupling means are attached to the reciprocating body whereby power may be applied to operate the apparatus. The device is particularly adapted for stretching plastic shrink bands for wrapping of fruit such as bananas, carrots, etc., without causing damage to the fruit.

---

This invention relates to an apparatus for applying an elastic band to a plurality of elongated objects. More specifically, this invention relates to an apparatus for applying a stretchable plastic band to a group of elongated fruit or vegetable bodies.

One method of packaging fruits and vegetables such as bananas, asparagus, rhubarb, celery, carrots and others having elongated bodies has been to surround the bodies with a rubber band or with inelastic bands such as paper string, or paper-covered wire. These materials suffer certain disadvantages, namely, that they cause cutting or bruising of the fruit or vegetable, thus decreasing the market value of the packaged product. It has been discovered that plastic stretchable bands made from either oriented or unoriented plastic materials, particularly polyvinyl chloride and polyethylene, have been found eminently suitable for banding fruits and vegetables. Stretch film bands made from particular formulations of polyvinyl chloride can be stretched and contracted at ambient temperature. While there are a number of machines available for stretching plastic bags to receive food items such as frankfurters, chickens, sausages and the like, these machines are not well adapted to stretching plastic bands for application to fruits and vegetables.

An object of this invention is to provide an apparatus for applying a stretchable plastic band to fruits and vegetables.

Another object of this invention is to provide an apparatus for applying a stretchable plastic band to fruits and vegetables without bruising or damaging the fruits or vegetables.

A further object of this invention is an apparatus for applying a plastic band to fruits or vegetables which apparatus is of simple construction and requires low maintenance.

A still further object of this invention is the provision of an apparatus for applying a plastic band to fruits and vegetables which apparatus can be operated by a foot power.

Still another object of this invention is the provision of an apparatus for applying an elastic plastic band to fruits and vegetables which apparatus is portable and can be conveniently moved from one location to another.

The foregoing, and other aims, objects, and advantages of the invention as may appear hereinafter are realized in an apparatus for an elastic plastic band to a plurality of elongated objects which apparatus includes a support means. A plurality of pivotally mounted fingers are positioned on the support means. A reciprocating body is provided which engages the fingers to spread and retract them. Coupling means is attached to the reciprocating means whereby power may be applied to the apparatus.

In the drawings:

FIG. 1 is a side elevational view of an apparatus for stretching an elastic plastic band constructed in accordance with the present invention.

FIG. 2 is a side elevational view similar to FIG. 1 showing the apparatus with the fingers in the open position;

Figure 3:
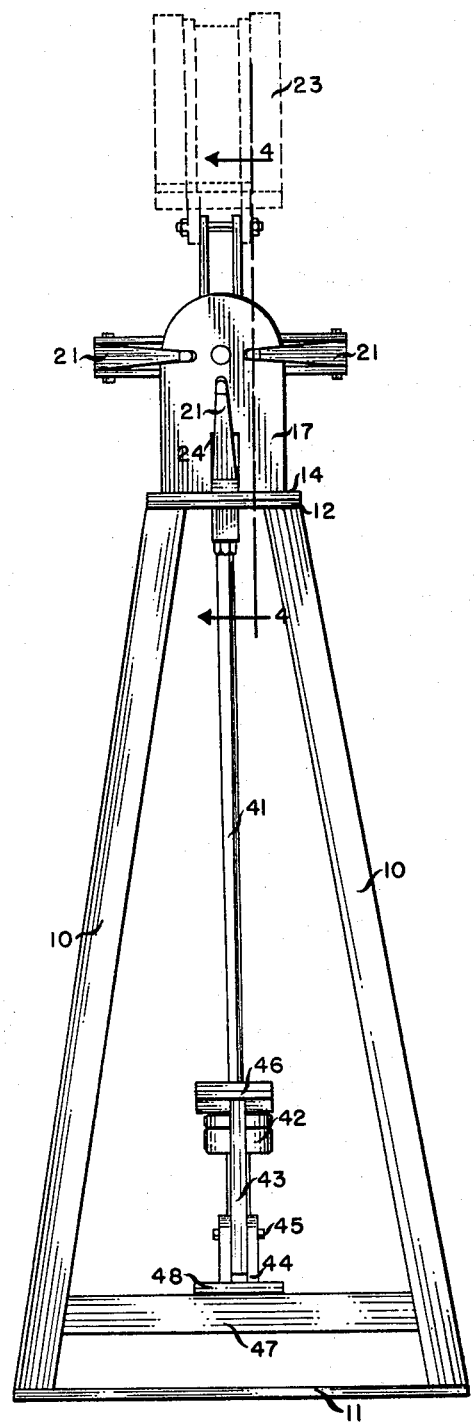
FIG. 3 is a front elevational view of the apparatus of FIG. 1.

Referring now to FIGS. 1 and 3, the banding apparatus illustrated has four downwardly diverging support legs 10 which are attached to a rectangular-shaped support frame 11 at their lower ends. The upper ends of support legs 10 are attached by welding or other suitable means to a rectangular base plate 12, as may be seen more clearly in FIG. 4.

Figure 5:
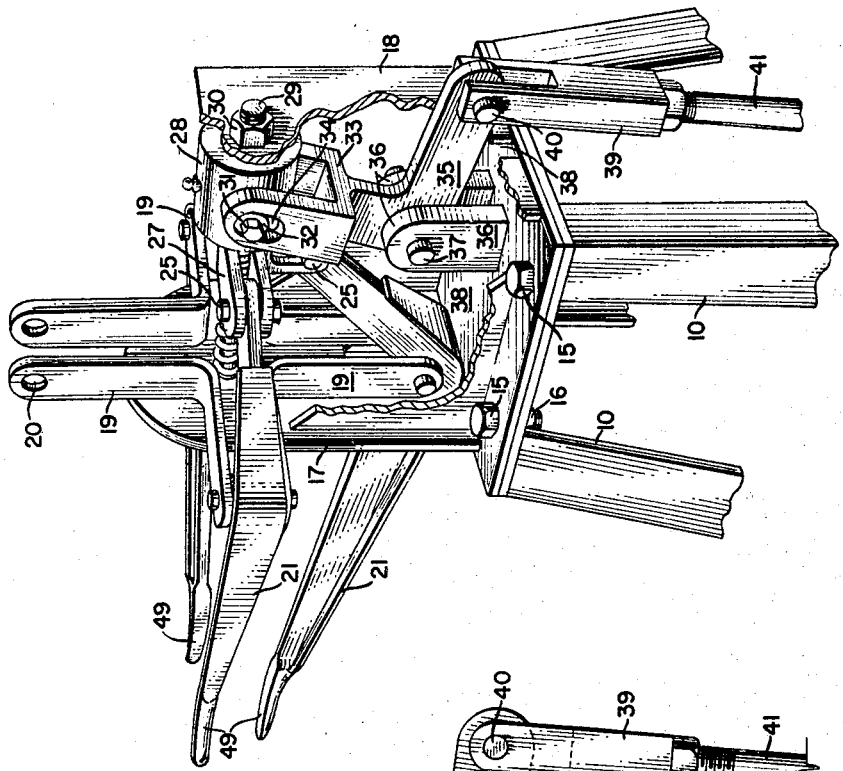
FIG. 5 is an enlarged perspective view of a portion of the apparatus of FIG. 1 with portions broken away to more clearly show the details of the apparatus.
Figure 4:
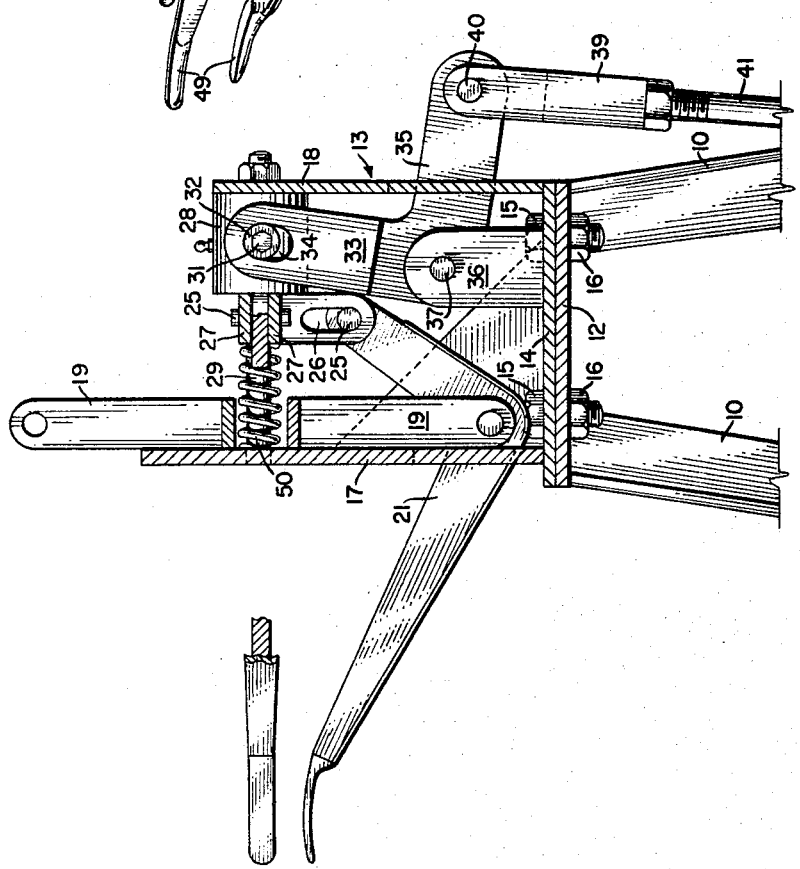
FIG. 4 is an enlarged sectional view of the apparatus of FIG. 3 taken along the line 4—4.

The band spreading assembly, designated generally by the numeral 13, includes a rectangular bottom plate 14 corresponding in size to the base plate 12 and attached thereto by bolts 15 and nuts 16, as seen in FIGS. 4 and 5. A front support bracket 17 is attached by welding or other suitable means adjacent one edge of bottom plate 14. A back support bracket 18 is attached to the opposite edge of bottom plate 14 by welding or other suitable means.

As may be seen in FIG. 5, four L-shaped support members 19 are attached to the rear of front support plate 17 to provide four pairs of support arms. Each of the L-shaped support members 19 is provided with an opening 20 in each end thereof. An L-shaped stretching finger 21 is pivotally attached by the means of a pin 22 to the spaced-apart support members 19. As can be seen in FIG. 5 the topmost pair of support members 19—19 does not carry a stretching finger. Instead, this pair of support members is utilized for supporting a receptacle 23 shown in dotted outline in FIGS. 1 and 3. In general, three fingers are all that are needed in packaging most fruits and vegetables, however, if desired, four fingers can be conveniently utilized in the apparatus of the present invention. As seen in FIG. 3, the front support bracket 17 is provided with an opening 24 through which the lowermost arm 21 extends. This opening is generally rectangular in shape and sufficiently large so that the finger may pivot freely between the contracted and expanded positions of the machine.

The rearward end of each finger 21 is provided with an outwardly extending pin 25 which extends on either side thereof, as seen more clearly in FIGS. 4 and 5. These pins 25 are received in an opening 26 provided in spaced-apart lugs 27 which are attached to the front face of collar 28 by welding or other suitable means.

Collar 28 is slidably mounted on stud 29 which is threadably attached to front support plate 17 and extends through an opening provided in rearward bracket 18. A nut 30 on one end of stud 29 provides support for back support bracket 18.

A bolt 31 is threadably attached to either side of collar 28 and carries thereon a rotatable sleeve 32. A U-shaped bracket 33 has an elongated opening 34 provided in the upper end of each arm thereof. The bolt 31 and rotatable sleeve 32 carried thereby is received in this opening 34.

The bottom of the bracket 33 has attached thereto an L-shaped arm 35. The arm is pivotally mounted between a pair of spaced-apart members 36—36 by means of pivot pin 37. The outward extending end of arm 35 extends through an opening 38 in back support plate 18. A connector link 39 is attached at its bifurcated end to the end of arm 35 by means of pin 40, the opposite end being connected to rod 41.

Referring now to FIGS. 1 and 3, a second connector link 39 is attached to the lower end of rod 41 and supports a series of counterweights 42 mounted on rod 41. A lever 43 is pivotally connected on one end to connector link 39. The lever 43 is pivotally mounted on U-shaped bracket 44 by means of pin 45 adjacent the end which is connected to rod 41. The opposite end of lever 43 carries a foot pedal 46. A crossbar 47 extends between legs 10—10 and carries one end of support strap 48 on which is mounted the U-shaped bracket 44. The opposite end of strap 48 is attached to a crossbar positioned between the pair of legs 10—10 on the opposite side of the apparatus.

Figure 6:
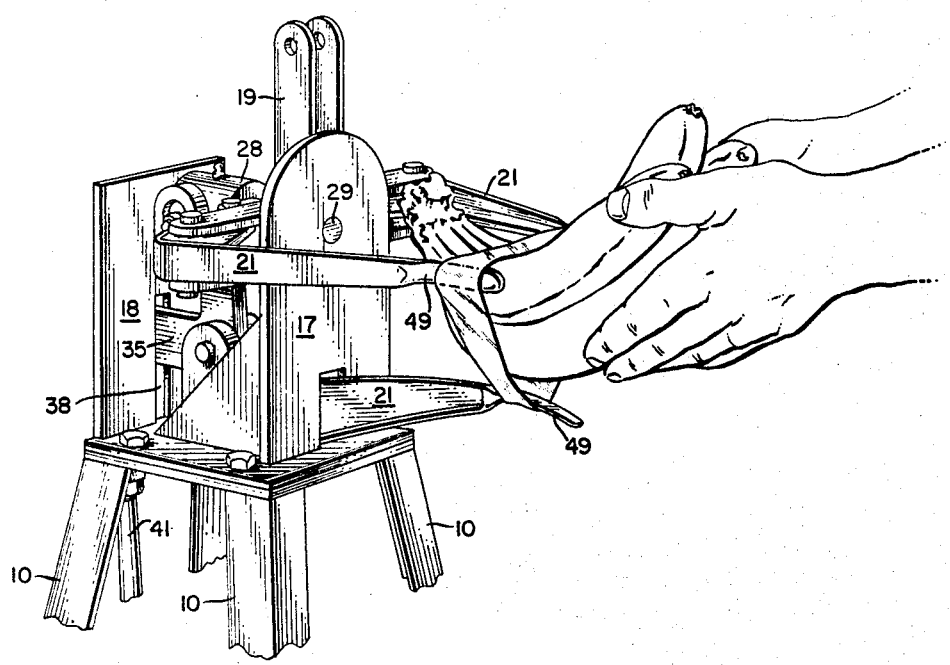
FIG. 6 is a perspective view of an apparatus constructed in accordance with the present invention showing the apparatus in use applying an elastic plastic band to a hand of bananas.

In operation, the operator takes a flattened plastic band from the receptacle 23 and places it on the curved ends 49 of fingers 21, as may be seen more clearly in FIG. 6. He depresses the foot pedal 46 thereby raising rod 41 which pivots the L-shaped arm 35 upward to the position shown in FIG. 2. This moves the collar 28 forwardly along rod 29 compressing spring 50. As seen in FIG. 4, the lugs 27 move the rearward ends of the fingers 21 forward by means of pin 25 which moves upwardly in slot 26. The forward movement of the rear ends of arms 21 causes the curved fingers 49 to spread apart. The pair of arms mounted for horizontal movement move away from each other in a horizontal direction. The arm mounted for vertical movement moves in a downward direction. In their open position the arms stretch the plastic band, as may be seen in FIG. 6, into the shape of an equilateral triangle. The operator then inserts a group of articles, for example bananas, into the triangular-shaped opening and releases the foot pressure gently. The counterweights 42 pull down on the linked assembly causing the fingers to move towards the objects being packaged. These counterweights are adjusted so that they do not cause any severe pressure by the ends of the fingers 49 on the fruit being packaged thereby avoiding any bruising or injury to the packaged fruit. Since the rate of contraction of the stretched plastic band is rather slow, e.g., 5 to 15 seconds before contacting the fruit, the loose band is slipped off the fingers 49 by the operator's hands and held in position while he places the fruit on a conveyor belt or in a box. The band then continues its shrinking at ambient temperature and grips the packaged fruit products with sufficient force to hold them together. The force with which the plastic band constrains the fruit can be adjusted to prevent any damage to soft or delicate fruits by proper combination of physical and chemical properties of the plastic band.

While there has been described what is at present considered a preferred embodiment of the present invention, it will be apparent to those skilled in the art that various modifications and changes may be made without departing from the essence of the invention, and particularly, that the invention herein described and claimed is particularly adapted to packaging many other objects in addition to fruits and vegetables.

What is claimed is:

1. An apparatus for stretching an elastic band for application to a plurality of elongated objects comprising:
    (a) bottom support plate means;
    (b) front support bracket means mounted on said bottom support plate means;
    (c) a plurality of generally L-shaped fingers pivotally mounted intermediate their ends on and projecting outwardly from said front support bracket means;
    (d) a single common reciprocating means engaging the rearward end of each of said L-shaped fingers to open and close said fingers upon reciprocation; and
    (e) power transmission means engaging said reciprocating means to produce reciprocation upon alternative application and removal of power.

2. An apparatus for stretching an elastic band for application to a plurality of elongated objects comprising:
    (a) bottom support plate means;
    (b) front support bracket means mounted on said bottom support plate means;
    (c) a plurality of finger support means mounted on said front support bracket means;
    (d) a plurality of fingers pivotally mounted on said finger support means;
    (e) back support bracket means mounted on said bottom support plate means and spaced rearwardly from said front support bracket means;
    (f) support means extending between said front support bracket means and said back support bracket means;
    (g) reciprocating means carried by said support means engaging the rearward ends of said fingers and adapted upon reciprocation to cause said fingers to pivot to open and to close the forward ends of said fingers; and
    (h) power transmission means engaging said reciprocating means to produce reciprocation upon alternate application and removal of power.

3. An apparatus for stretching an elastic band for application to a plurality of elongated objects comprising:
    (a) a base support assembly;
    (b) a bottom plate mounted on said base support assembly;
    (c) a front support bracket vertically mounted adjacent one edge of said bottom plate;
    (d) a back support bracket vertically mounted opposite said front support bracket adjacent one edge of said bottom plate;
    (e) a plurality of finger support members mounted on said front support bracket;
    (f) a plurality of fingers pivotally mounted on said finger support members;
    (g) a stud extending between said front and said back support bracket;
    (h) a reciprocably mounted collar on said stud;
    (i) a plurality of lugs carried by said collar engaging the rear ends of said fingers;
    (j) an L-shaped arm having one end engaging said collar;
    (k) a support member on said bottom plate pivotally mounting said L-shaped arm; and
    (l) power transmission means engaging the other end of said L-shaped arm to cause said arm to pivot reciprocating said collar and thereby opening and closing the forward ends of said fingers.

References Cited

UNITED STATES PATENTS

| | | | |
|---|---|---|---|
| 1,955,949 | 4/1934 | Colton | 29—235.5 X |
| 2,574,195 | 11/1951 | Sherrick | 29—235 X |
| 2,885,850 | 5/1959 | Smith | 53—261 X |
| 2,969,629 | 1/1961 | Blais | 53—261 X |
| 3,186,333 | 6/1965 | Hoffman et al. | 29—235 X |

WILLIAM W. DYER, Jr., *Primary Examiner.*

ROBERT C. RIORDON, *Examiner.*

N. ABRAMS, *Assistant Examiner.*